United States Patent
Evans et al.

(10) Patent No.: US 6,513,923 B1
(45) Date of Patent: *Feb. 4, 2003

(54) INK JET PRINTING METHOD

(75) Inventors: Steven Evans, Rochester, NY (US); Barbara L. Grady, Webster, NY (US); Charles E. Romano, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/848,082

(22) Filed: May 3, 2001

(51) Int. Cl.$^7$ .................................................. B41J 2/01
(52) U.S. Cl. ......................................... 347/100; 347/96
(58) Field of Search ........................... 347/100, 96, 95, 347/98; 106/31.58, 31.48, 31.27

(56) References Cited

U.S. PATENT DOCUMENTS

| | | | | |
|---|---|---|---|---|
| 4,725,849 A | * | 2/1988 | Koike et al. | 347/100 |
| 5,792,559 A | * | 8/1998 | Heithoff et al. | 428/437 |
| 6,051,036 A | * | 4/2000 | Kusaki et al. | 347/107 |
| 6,183,548 B1 | * | 2/2001 | Erdtmann et al. | 106/31.48 |
| 6,261,350 B1 | * | 7/2001 | Kabalnov | 106/31.33 |
| 6,354,688 B1 | * | 3/2002 | Inoue et al. | 347/43 |

* cited by examiner

*Primary Examiner*—John Barlow
*Assistant Examiner*—Manish S. Shah
(74) *Attorney, Agent, or Firm*—Harold E. Cole

(57) ABSTRACT

An ink jet printing method, including the steps of:

A) providing an ink jet printer that is responsive to digital data signals;

B) loading the printer with an ink jet recording element;

C) loading the printer with a color ink jet ink set having:
  (i) a magenta ink having a carrier and a water-soluble, transition metal complex of an 8-heterocyclylazo-5-hydroxyquinoline dye;
  (ii) a yellow ink having a carrier and a water-soluble yellow dye;
  (iii) a cyan ink having a carrier and a water-soluble cyan dye; and
  (iv) an orange and/or green and/or violet ink having a carrier and a water-soluble orange and/or green and/or violet dye; and D) printing on the image-receiving layer using the inkjet ink set in response to the digital data signals.

16 Claims, No Drawings

INK JET PRINTING METHOD

CROSS REFERENCE TO RELATED APPLICATION

Reference is made to commonly assigned, co-pending U.S. patent application Ser. No. 09/848,081 by Romano et al., filed May 3, 2001 entitled "Ink Jet Ink Set".

FIELD OF THE INVENTION

This invention relates to an ink jet printing method which uses an ink jet ink set that provides images with improved color gamut.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant, which is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic co-solvents and high boiling organic solvents, such as hydrocarbons, esters, ketones, etc. For aqueous dye-based inks, the dyes needs to be sufficiently soluble in water to prepare a solution that is capable of producing adequate density on the receiving element and stable for extended periods of storage without precipitation. High quality ink jet printing with dye-based inks requires dyes which will provide both bright hue and good light fastness.

To generate full color prints via ink jet printing, ink sets comprising at least cyan, magenta and yellow inks are normally utilized. In addition a black ink is often added to enhance the printing of text and darker colors. The range of colors that can be produced with a given set of inks defines the color gamut of that ink set. For the production of high quality photorealistic images via ink jet printing, ink sets with a large color gamut are preferred. In addition, it is important that the ink sets produce images with good fastness, especially to light.

The choice of the colorants in ink jet systems is critical for both light fastness and color gamut. The color gamut of an ink set is controlled primarily by the spectral absorption characteristics of the component dyes. The primary dyes (e.g., cyan, magenta and yellow) should only absorb light of the required wavelengths (i.e., have relatively narrow absorption bands) and not overlap excessively with the dyes in the complementary inks. While there are many dyes with bright hues that are useful in inkjet printing, many have poor light fastness. Conversely many light stable dyes suitable for ink jet printing have broad absorption bands and give dull colors and limited color gamut.

U.S. Pat. No. 6,183,548 relates to an inkjet ink set comprising a magenta ink, yellow ink and a cyan ink and an optional black ink. However there is a problem with this ink jet ink set in that the color gamut is not as large as one would like.

It is an object of this invention to provide an ink jet printing method using a set of inks capable of producing images which has a better color gamut than the ink sets of the prior art.

SUMMARY OF THE INVENTION

This and other objects are achieved in accordance with the present invention comprising an ink jet printing method, comprising the steps of:

A) providing an ink jet printer that is responsive to digital data signals;

B) loading the printer with an ink jet recording element;

C) loading the printer with an color ink jet ink set comprising:
  (i) a magenta ink comprising a carrier and a water-soluble, transition metal complex of an 8-heterocyclylazo-5-hydroxyquinoline dye;
  (ii) a yellow ink comprising a carrier and a water-soluble yellow dye;
  (iii) a cyan ink comprising a carrier and a water-soluble cyan dye; and
  (iv) an orange and/or green and/or violet ink comprising a carrier and a water-soluble orange and/or green and/or violet dye; and D) printing on the image-receiving layer using the ink jet ink set in response to the digital data signals.

This printing method of the invention uses a color ink jet ink set which provides color gamuts suitable for pictorial imaging. A black ink can also be added to further increase the available color gamuts of this ink set.

DETAILED DESCRIPTION OF THE INVENTION

The ink sets used in the present invention are intended to be used in ink jet printers capable of printing four or more separate inks. At a minimum, cyan, magenta and yellow inks are required for full-color printing. The ink sets used in this invention include additional color inks that differ in hue from the cyan, magenta and yellow primaries; namely green, orange and/or violet. A black ink may be also be used to make text printing more efficient or to reduce overall ink lay-down when printing dark color areas.

The absorption characteristics of a given image dye will vary to some extent with a change in ink laydown or printed density. This is due to factors such as measurement flare, dye-dye interactions, dye-receiver interactions, dye concentration effects, and the presence of colored impurities in the media. However, by using characteristic vector analysis, sometimes referred to as principal component analysis or eigenvector analysis, one can determine a characteristic absorption curve that is representative of the absorption characteristics of the dye over the complete wavelength and density ranges of interest. The characteristic vector for each dye is thus a two-dimensional array of optical density and wavelength. This technique is described by Albert J. Sant in Photographic Science and Engineering, 5(3), May–June 1961 and by J. L. Simonds in the Journal of the Optical Society of America, 53(8), 968–974 (1963). Characteristic vectors thus derived can be used to calculate the color gamuts of ink sets described below as described in the above reference.

Dyes referred to by dye numbers are numbers assigned by The Color Index.

Any water-soluble yellow dye may be employed in the yellow ink of the ink jet ink set employed in the invention. In a preferred embodiment, the yellow dye is Direct Yellow 107, Direct Yellow 132, Direct Yellow 86 or mixtures thereof.

Any water-soluble cyan dye may be employed in the cyan ink of the ink jet ink set employed in the invention. In a preferred embodiment, the cyan dye is Acid Blue 9 or a water-soluble metal phthalocyanine dye such as Direct Blue 199 or Direct Blue 86 or mixtures thereof.

Any water-soluble black dye may be employed in the optional black ink of the ink jet ink set employed in the invention. In a preferred embodiment, the black dye is Reactive Black 31, Direct Black 19, Direct Black 168, Solubilized Sulfur Black or mixtures thereof.

The magenta inks employed in the invention may by formulated with one or more water-soluble, transition metal complexes of 8-heterocyclylazo-5-hydroxyquinoline dyes, represented by Structure 1 (below). These dyes are described in U.S. Pat. Nos. 5,997,622 and 6,001,161, the disclosures of which are hereby incorporated by reference:

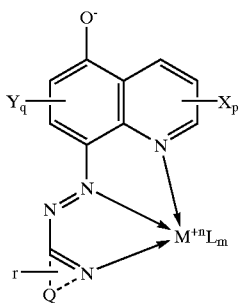

1 wherein:
M represents a polyvalent transition metal ion;
L represents a neutral or anionic ligand;
each X, Y and Z independently represents a substituted or unsubstituted alkyl group of 1 to about 6 carbon atoms, a substituted or unsubstituted aryl group of about 6 to about 10 carbon atoms, a substituted or unsubstituted hetaryl group of about 5 to about 10 atoms, halogen, cyano, a substituted or unsubstituted alkoxy group of 1 to about 6 carbon atoms, hydroxy, a polyoxyalkylene group of 2 to about 20 alkylene oxide residues, carboxy (or a salt thereof), sulfo (or a salt thereof), phospho (or a salt thereof), carbamoyl, a substituted or unsubstituted alkyl-, aralkyl-, aryl-, diaryl- or dialkyl carbamoyl group of 1 to about 20 carbon atoms, sulfamoyl, a substituted or unsubstituted alkyl-, aralkyl-, aryl-, diaryl- or dialkyl-sulfamoyl group of 1 to about 20 carbon atoms, acylamino, sulfonylamino, amino, a substituted or unsubstituted alkyl-, aralkyl-, aryl-, diaryl-or dialkyl-amino group of 1 to about 20 carbon atoms or a quaternary ammonium or phosphonium group;

Q represents the atoms necessary to complete a 5- or 6-membered heterocyclic ring;
n represents 2 or 3;
m represents an integer from 1–3;
each p and r independently represents integers from 0–3;
q represents 0, 1 or 2;
two or more of L may be joined together to form a bi- or tridentate ligand or may represent another polydentate dye molecule;
one or more of X, Y and Z, together with the carbon to which they are attached, may independently represent a ring nitrogen; and
any two of X, Y or Z may be joined together to form a 5–7 membered saturated or unsaturated ring;
with the proviso that at least one of X, Y and Z is a water solubilizing group or contains such a group as a substituent.

In a preferred embodiment of the invention, q is 0, Q represents the atoms necessary to complete a pyridine ring, r is 0, M is Ni, n is 2, m is 1, p is 2, X represents 2-methyl and 3-carboxy and L represents a second, identical 8-heterocyclylazo-5-hydroxyquinoline dye residue.

Preferred transition metal ions for M include $Ni^{2+}$, $Cu^{2+}$, $Zn^{2+}$, $Fe^{2+}$, $Fe^{3+}$, $C^{3+}$ and $Co^{2+}$.

Examples of neutral ligands for L include water, pyridine, morpholine, ammonia, bipyridine and terpyridine.

Examples of anionic ligands for L include acetate, iminodiacetate, glycine and 8-hydroxyquinoline.

Examples of a substituted or unsubstituted alkyl group for the above substituents include methyl, ethyl, isopropyl, hydroxyethyl, 3-(N,N-dimethylamino)propyl, sulfatoethyl and benzyl. Examples of a substituted or unsubstituted aryl group include phenyl, naphthyl 4-chlorophenyl and 2-carboxyphenyl. Examples of a substituted or unsubstituted hetaryl group include pyridyl, imidazolyl and quinolyl. Examples of halogen include chloro, fluoro, bromo and iodo. Examples of a substituted or unsubstituted alkoxy group include methoxy, isopropoxy, 2-hydroxyethoxy and carboxymethoxy. Useful salts of carboxy, sulfo, phospho and sulfato include sodium, lithium, potassium, triethanolammonium, pyridinium and tetramethylammonium. Examples of a substituted or unsubstituted alkyl-, aralkyl-, aryl-, diaryl- or dialkyl carbamoyl group include N-methylcarbamoyl, N-methyl-N-(3sulfophenyl)-carbamoyl, N-p-(trimethylammonium)phenylcarbamoyl and N,N-bis (4-carboxyphenyl)carbamoyl. Examples of a substituted or unsubstituted alkyl-, aralkyl-, aryl-, diaryl- or dialkyl sulfamoyl group include N-methylsulfamoyl, N-methyl-N-(3sulfophenyl)-sulfamoyl, N-p-(trimethylammonium)phenylsulfamoyl and N,N-bis (4-carboxyphenyl)sulfamoyl. Examples of an acylamino group include acetamido, carboxyethylacetamido and benzamido. Examples of a ureido group include n-methylureido, ureido and 3,5-bis carboxyphenylureido. Examples of a sulfonylamino group include methanesulfonamido, p-toluenesulfonamido and 2-(trimethlyammonium)ethanesulfonamido. Examples of a substituted or unsubstituted alkyl-, aralkyl-, aryl-diaryl- or dialkyl-amino group include methylamino, N,N-dimethylamino, carboxymethylamino and 2,5-disulfonamido. Examples of a quaternary ammonium group include trimethylammonium and benzyldimethylammonium. Examples of a phosphonium group include triphenylphosphonium and trimethlyphosphonium.

Examples of heterocyclic ring systems completed by the atoms represented by Q include pyridine, pyrazine, quinoline, thiazole, benzothiazole and pyrazole.

Specific dyes according to Structure 1 useful in this invention include:

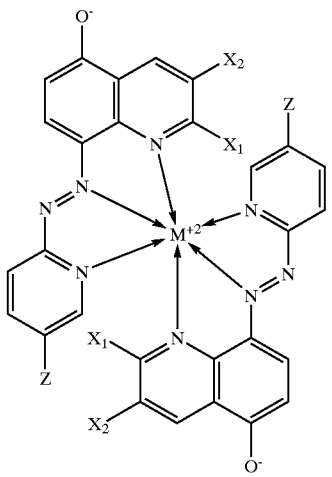

TABLE 1

| Dye | M  | $X_1$           | $X_2$   | Z                  | λ-max[1] |
|-----|----|-----------------|---------|--------------------|----------|
| 1   | Ni | Cl              | $CO_2H$ | $SO_2NHCH(CH_3)_2$ | 559      |
| 2   | Cu | Cl              | $CO_2H$ | $SO_2NHCH(CH_3)_2$ | 547      |
| 3   | Ni | Cl              | $CO_2Na$| H                  | 550      |
| 4   | Ni | Cl              | $CO_2H$ | H                  | 551      |
| 5   | Ni | H               | $CO_2H$ | H                  | 546      |
| 6   | Ni | $CH_3$          | $CO_2H$ | H                  | 552      |
| 7   | Ni | $CO_2H$         | $CO_2H$ | H                  | 554      |
| 8   | Ni | $OC_2H_5$       | $CO_2H$ | H                  | 546      |
| 9   | Ni | $SC_3H_6SO_3^-Na^+$ | $CH_3$ | H                 | 563      |

[1]Measured in 1% aqueous triethanolamine

U.S. Pat. No. 6,183,548, discussed above, describes a set of cyan, magenta, yellow and optionally black inks comprising specific dyes including Dyes A,B,C and D (below). These ink sets are designated hereinafter as the base sets CMY and CMYK as described in the examples below.

A. Direct Blue 199, available as Duasyn Turquoise Blue FRL-SF® from Clariant Corp.

B. Kodak Lightfast Magenta 1®, a transition metal complex of an 8-heterocyclylazo-5-hydroxyquinoline dye manufactured by Eastman Kodak, (see Table 1 below)

C. Direct Yellow 132, available as ProJet Yellow 1G® from Zeneca Specialties.

D. Reactive Black 31, available as Duasyn Black KRL-SF® from Clariant Corp.

One or more additional inks comprising green, orange and/or violet dyes may be used in addition to the above base sets to give ink sets with a larger color gamut. Any water-soluble orange and/or green and/or violet dye may be used in the invention. In a preferred embodiment, the orange dye has a hue angle between about 58 and 83. In another preferred embodiment, the green dye has a hue angle between about 128 and 189. In yet another preferred embodiment, the violet dye has a hue angle between about 235 and 315.

Following are examples of specific orange, green and violet dyes which can be used in the invention:

E. Acid Orange 7 (Keyacid Orange II, available from Keystone Aniline Corp.)

F. Keyacid Fast Orange G, available from Keystone Aniline Corp.

G. Acid Orange 8 (Keyacid Orange RO, available from Keystone Aniline Corp.)

H. Acid Orange 10 (Keyacid Orange 2G, available from Keystone Aniline Corp.)

I. Acid Orange 12 (Orange G, available from Aldrich Chemical Co.)

J. Food Yellow 3 (FD&C Yellow #6, available from Tricon Colors)

K. Reactive Yellow 84, available from Dye-Land

L. Acid Orange 24 (Resorcine Brown B, available from Aldrich Chemical Co.)

M. Acid Orange 33 (BRYtracid Fast Orange GS, available from BRY Chemicals)

N. Reactive Orange 5 (BRYreact Brilliant Orange K-GN, available from BRY Chemicals)

O. Reactive Orange 20 (BRYreact Orange KE-G, available from BRY Chemicals)

P. Reactive Orange 107, available from Dye-Land

Q. Reactive Orange 1 (BRYreact Brilliant Orange X-GN 140%, available from BRY Chemicals)

R. Orange LX-10432 (a mixture of Food Yellow 3 and Acid Orange 10) available from Pylam Corp.

S. Levolfast Green BD, available from Keystone Aniline Corp.

T. Acid Green 25 (Keyacid Green 25, available from Keystone Aniline Corp.)

U. Reactive Green 12, available from Tricon Colors

V. Acid Green 3 (Guinea Green B, available from Aldrich Chemical Co.)

W. Acid Green 5 (Light Green SF, available from Aldrich Chemical Co.)

X. Acid Green 1 (Napthol Green B, available from Aldrich Chemical Co.)

Y. BRYtracid Brilliant Green 3GM 150%, available from BRY Chemicals

Z. Acid Green 16 (BRYacid Green V, available from BRY Chemicals)

AA. Bright Green 125961 available from Pylam Corp.

BB. Acid Violet 17, available from Aldrich Chemical Co.

In a preferred embodiment of the invention, the water-soluble orange dye is Reactive Orange 5, Acid Orange 10 or Acid Orange 12.

In another preferred embodiment of the invention, the water-soluble green dye is Reactive Green 12, Acid Green 25, Acid Green 5 or Acid Green 3.

In still another preferred embodiment of the invention, the water-soluble violet dye is Acid Violet 17.

In general, the inks employed in this invention comprise the above dyes at a concentration of from about 0.2 to about 10%, preferably from about 0.4 to about 3% by weight of the inkjet ink composition.

A humectant is usually employed in the ink jet compositions employed in the invention to help prevent the ink from drying out or crusting in the orifices of the printhead. Examples of humectants which can be used include polyhydric alcohols, such as ethylene glycol, diethylene glycol (DEG), triethylene glycol, propylene glycol, tetraethylene glycol, polyethylene glycol, glycerol, 2-methyl-2,4-pentanediol, 2-ethyl-2-hydroxymethyl-1,3-propanediol (EHMP), 1,5 pentanediol, 1,2-hexanediol, 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, poly(ethylene glycol) monobutyl ether (PEGMBE), and diethylene glycol monobutylether(DEGMBE); nitrogen-containing compounds, such as urea, 2-pyrrolidinone, N-methyl-2-pyrrolidinone, and 1,3-dimethyl-2-imidazolidinone; and sulfur-containing compounds such as dimethyl sulfoxide and tetramethylene sulfone.

Preferred humectants for the inks employed in the invention include DEG, glycerol, DEGMBE, PEGMBE, 1,2-hexanediol, 1,5-pentanediol, urea, 2-pyrrolidinone, EHMP and mixtures thereof.

Water-miscible organic solvents may also be added to the aqueous inks employed in the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

The amount of aqueous carrier employed is in the range of approximately 70 to 98 weight %, preferably approximately 90 to 98 weight %, based on the total weight of the ink. A mixture of water and a polyhydric alcohol, such as diethylene glycol, is useful as an aqueous carrier. In a preferred embodiment, the inks contain from about 5 to about 60 weight % of water miscible organic solvent. Percentages are based on the total weight of the aqueous carrier.

Surfactants may be added to the ink to adjust the surface tension to an appropriate level. The surfactants may be anionic, cationic, amphoteric or nonionic and used at levels of 0.01 to 1% of the ink composition. Preferred surfactants include Surfynol 465® (available from Air Products Corp.) and Tergitol 15-S-5® (available from Union Carbide).

A biocide may be added to the ink composition employed in the invention to suppress the growth of micro-organisms such as molds, fungi, etc. in aqueous inks. A preferred biocide for the ink composition employed in the present invention is Proxel® GXL (Zeneca Specialties Co.) at a final concentration of 0.0001–0.5 wt. %.

The pH of the aqueous ink compositions employed in the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A typical ink composition employed in the invention may comprise, for example, the following components by weight: colorant (0.05–20%), water (20–95%), a humectant (5–70%), water miscible co-solvents (2–20%), surfactant (0.1–10%), biocide (0.05–5%) and pH control agents (0.1–10%).

Additional additives which may optionally be present in the ink jet ink compositions employed in the invention include thickeners, conductivity enhancing agents, anti-kogation agents, drying agents, and defoamers.

The ink jet inks described above may be employed in ink jet printing wherein liquid ink drops are applied in a controlled fashion to an ink receptive layer substrate, by ejecting ink droplets from a plurality of nozzles or orifices of the print head of an ink jet printer.

Commercially available ink jet printers use several different schemes to control the deposition of the ink droplets. Such schemes are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

Ink jet inks employed in the present invention can be used in any of the popular ink jet printing systems, including thermal or piezoelectric drop-on-demand printers and continuous ink jet printers. Of course, the specific ink formulations will vary depending upon the type of ink jet printing system.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

The following examples illustrate the utility of the present invention.

EXAMPLES

Preparation of Inks

Inks were prepared by mixing the dyes with water, diethylene glycol, glycerol, and Surfynol® 465 and optionally triethanolamine. The mixture was stirred in a warm water bath until the dye was in solution.

The amount of dye used was based on the solution absorption spectrum in water such that the weight % of dye in the ink is equal to [1/solution mass absorbtivity in L/g-cm]×100. The other components were: 6 weight % glycerol, 6 weight % diethylene glycol, 2.0 weight % triethanolamine (if needed to aid dissolution) and 0.5 weight % Surfynol® 465.

Printing of Test Images

Each of the above inks was filtered with a 0.45 $\mu$m syringe filter and loaded into one of the color chambers of an empty Lexmark Z51 ink cartridge and then printed onto Kodak Premium Picture Paper using a Lexmark Z51 printer. A step wedge image consisting of eleven color patches (1 cm×1 cm) varying in ink coverage from 10 to 100% in 10% increments was printed.

Evaluation of Test Images

After allowing sufficient time for drying, the densities of the step wedge images from above were read using a Gretag Spectrolino® Spectrophotometer over the wavelength range of 380–730 nm in intervals of 10 nanometers. A gas-filled tungsten, type A illumination was used with a 4 mm nominal aperture and the measurement geometry employed was 45°/0° ring optic.

Color Gamut and Hue Angle

From the densities measured above, characteristic vector analysis was used to construct a characteristic absorption curve over the range of the visible spectrum (380–730 nm) for each of the inks. The characteristic vector for each ink is a two-dimensional array of optical density vs. wavelength. This technique is described by A. J. Sant in *Photographic Science and Engineering*, 5(3), May-June, 1961, and by J. L. Simonds in the *Journal of the Optical Society of America*, 53 (8), 968–974 (1963).

These characteristic vectors were used to define the color characteristics of each of the printed ink images and the combinations thereof used in the calculation of the color gamuts for the various ink sets listed in the following tables. CIElab coordinates (a*, b* and L*) were calculated, assuming a reflection density of 2.0 at the lambda max of the printed sample and are listed in Table 2.

Hue angle correlates with hue which is defined to be the attribute of a visual sensation according to which an area appears to be similar to one of the perceived colors, red, yellow, green, and blue, or to a combination of two of them. Hue angle was calculated using the characteristic vectors described above, assuming a reflection density of 2.0 at the lambda max of the printed sample and are also listed in Table 2. The standard CIE 1976 a, b, hue angle formula was used, e.g.:

$$h_{ab} = \arctan(b^*/a^*)$$

where a* and b* are CIELab coordinates of the dye. Chroma (C*) relates to the brightness or saturation of a given color. Chroma values for each printed image above were calculated from the CIElab coordinates calculated for each dye assuming a reflection density of 2.0 at the lambda max of the printed sample and also listed in Table 2.

$$C^* = \sqrt{[(a^*)^2 + (b^*)^2]}$$

Theoretical color gamuts were calculated by the following procedure for the CMY (Dyes A,B and C) and CMYK (Dyes A,B,C and D) base sets and the ink sets formed by adding designated orange, green and/or violet dyes to the base sets. The results are set forth in Table 3. In general, the larger the gamut, the more possible colors that a given ink set can reproduce.

For the purpose of this invention, color gamut is specified using the conventional metric generally associated with reflection prints, which is CIELAB. The 1931 CIE 2° standard observer color matching functions as well as the CIE defined illuminant D5000 were used. This information and the characteristic vectors described above were used to calculate the color gamut at a particular L* value for each set of inks, using the method described in the *Journal of Photographic Science*, 38, 163 (1990). Note that for this calculation no light scatter is assumed. The color gamut values cited in the following table represent the sum of the a* vs. b* areas at nine different L* slices (10, 20, 30, 40, 50, 60, 70, 80, and 90) calculated for each ink set. The areas at each L* slice were determined using a trapezoidal rule summation along the b* axis.

TABLE 2

| Dye | a* | b* | L* | Hue Angle | Chroma (C*) |
|---|---|---|---|---|---|
| A | −58.6 | −45.5 | 59.9 | 217.9 | 74.2 |
| B | 89.0 | −36.3 | 48.7 | 337.8 | 96.1 |
| C | −5.3 | 104.1 | 95.2 | 92.9 | 104.2 |
| D | 13.2 | 1.3 | 12.3 | 5.7 | 13.2 |
| E | 44.2 | 103.3 | 80.0 | 66.9 | 112.3 |
| F | 54.4 | 99.2 | 70.9 | 61.3 | 113.1 |
| G | 55.0 | 88.7 | 75.1 | 58.2 | 104.4 |
| H | 30.6 | 104.6 | 85.0 | 73.7 | 109.0 |
| I | 39.1 | 116.7 | 81.9 | 71.5 | 123.1 |
| J | 43.9 | 103.0 | 79.4 | 66.9 | 112.0 |
| K | 15.4 | 115.4 | 88.2 | 82.4 | 116.4 |
| L | 30.2 | 110.0 | 80.6 | 74.7 | 114.1 |
| M | 48.3 | 91.9 | 77.7 | 62.3 | 103.8 |
| N | 30.2 | 107.7 | 83.5 | 74.3 | 111.8 |
| O | 50.0 | 105.1 | 76.0 | 64.6 | 116.4 |

TABLE 2-continued

| Dye | a* | b* | L* | Hue Angle | Chroma (C*) |
|---|---|---|---|---|---|
| P | 18.0 | 121.1 | 88.0 | 81.5 | 122.4 |
| Q | 39.7 | 117.2 | 81.7 | 71.3 | 123.8 |
| R | 42.2 | 104.1 | 80.6 | 67.9 | 112.4 |
| S | −51.2 | 18.3 | 39.4 | 160.3 | 54.4 |
| T | −69.8 | −9.6 | 51.2 | 187.9 | 70.4 |
| U | −82.8 | 26.3 | 72.3 | 162.4 | 86.9 |
| V | −75.1 | −10.6 | 71.3 | 188.0 | 75.8 |
| W | −76.1 | −2.7 | 75.1 | 182.0 | 76.1 |
| X | −45.6 | 47.3 | 58.9 | 134.0 | 65.7 |
| Y | −86.7 | 19.0 | 76.0 | 167.6 | 88.7 |
| Z | −92.2 | 16.5 | 74.0 | 169.8 | 93.7 |
| AA | −71.1 | 84.8 | 77.2 | 130.0 | 110.7 |
| BB | 54.6 | −94.1 | 38.2 | 300.1 | 108.8 |

TABLE 3

| Base Set | Additional Dye | Color Gamut |
|---|---|---|
| CMY | None (Control) | 55073 |
| CMY | AA | 6899069054 |
| CMY | E | 72739 |
| CMY | F | 68991 |
| CMY | G | 71985 |
| CMY | H | 73308 |
| CMY | I | 72728 |
| CMY | J | 72151 |
| CMY | K | 69171 |
| CMY | L | 68586 |
| CMY | M | 72089 |
| CMY | N | 71539 |
| CMY | O | 71243 |
| CMY | P | 70765 |
| CMY | Q | 72712 |
| CMY | R | 72746 |
| CMY | S | 61680 |
| CMY | T | 60027 |
| CMY | U | 64754 |
| CMY | V | 63254 |
| CMY | W | 64928 |
| CMY | X | 61922 |
| CMY | Y | 67121 |
| CMY | Z | 67444 |
| CMY | BB | 68581 |
| CMY | AA + BB | 82809 |
| CMY | AA + H | 84027 |
| CMY | H + BB | 87166 |
| CMYK | None (Control) | 61842 |
| CMYK | AA | 71711 |
| CMYK | H | 75602 |
| CMYK | BB | 73158 |

The above results show that the use of orange and/or green and/or violet inks along with a base ink set comprising a magenta ink containing a water-soluble, transition metal complex of an 8-heterocyclylazo-5-hydroxyquinoline dye, a yellow ink, a cyan ink and optionally a black ink gives significantly larger color gamut than the base sets alone.

The invention has been described in detail with particular reference to useful embodiments thereof, but it will be understood that variations and modifications can be effected within the spirit and scope of the invention.

What is claimed is:

1. An ink jet printing method, comprising the steps of:
    A) providing an ink jet printer that is responsive to digital data signals;
    B) loading said printer with an ink jet recording element;
    C) loading said printer with color ink jet ink set comprising:
        (i) a magenta ink comprising a carrier and a water-soluble, transition metal complex of an 8-heterocyclylazo-5-hydroxyquinoline dye;

(ii) a yellow ink comprising a carrier and a water-soluble yellow dye;

(iii) a cyan ink comprising a carrier and a water-soluble cyan dye; and (iv) an orange and/or green and/or violet ink comprising a carrier and a water-soluble orange and/or green and/or violet dye, said water-soluble orange dye having a hue angle between about 58 and about 83; said water-soluble green dye having a hue angle between about 128 and about 189; and said water-soluble violet dye having a hue angle between about 235 and about 315; and D) printing on said image-receiving layer using said ink jet ink set in response to said digital data signals.

2. The method of claim 1 wherein said water-soluble, transition metal complex of an 8-heterocyclylazo-5-hydroxyquinoline dye is represented by the following structure:

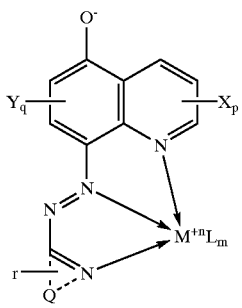

wherein:

M represents a polyvalent transition metal ion;

L represents a neutral or anionic ligand;

each X, Y and Z independently represents a substituted or unsubstituted alkyl group of 1 to about 6 carbon atoms, a substituted or unsubstituted aryl group of about 6 to about 10 carbon atoms, a substituted or unsubstituted hetaryl group of about 5 to about 10 atoms, halogen, cyano, a substituted or unsubstituted alkoxy group of 1 to about 6 carbon atoms, hydroxy, a polyoxyalkylene group of 2 to about 20 alkylene oxide residues, carboxy, sulfo, phospho, carbamoyl, a substituted or unsubstituted alkyl-, aralkyl-, aryl-, diaryl- or dialkyl carbamoyl group of 1 to about 20 carbon atoms, sulfamoyl, a substituted or unsubstituted alkyl-, aralkyl-, aryl-, diaryl- or dialkyl-sulfamoyl group of 1 to about 20 carbon atoms, acylamino, sulfonylamino, amino, a substituted or unsubstituted alkyl-, aralkyl-, aryl-, diaryl- or dialkyl-amino group of 1 to about 20 carbon atoms or a quaternary ammonium or phosphonium group;

Q represents the atoms necessary to complete a 5- or 6-membered heterocyclic ring;

n represents 2 or 3;

m represents an integer from 1–3;

each p and r independently represents integers from 0–3;

q represents 0, 1 or 2;

two or more of L may be joined together to form a bi- or tridentate ligand or may represent another polydentate dye molecule;

one or more of X, Y and Z, together with the carbon to which they are attached, may independently represent a ring nitrogen; and any two of X, Y or Z may be joined together to form a 5–7 membered saturated or unsaturated ring;

with the proviso that at least one of X, Y and Z is a water solubilizing group or contains such a group as a substituent.

3. The method of claim 2 wherein q is 0, Q represents the atoms necessary to complete a pyridine ring, r is 0, M is Ni, n is 2, m is 1, p is 2, X represents 2-methyl and 3-carboxy and L represents a second, identical 8-heterocyclylazo-5-hydroxyquinoline dye residue.

4. The method of claim 1 wherein said cyan dye is a copper phthalocyanine dye or Acid Blue 9.

5. The method of claim 4 wherein said copper phthalocyanine dye is Direct Blue 199 or Direct Blue 86.

6. The method of claim 1 wherein said yellow dye is Direct Yellow 107, Direct Yellow 132 or Direct Yellow 86.

7. The method of claim 1 further comprising as an additional black ink comprising a carrier and a water-soluble black dye.

8. The method of claim 7 wherein said water-soluble black dye is Reactive Black 31, Direct Black 19, Direct Black 168 or Solubilized Sulfur Black 1.

9. The method of claim 1 wherein said water-soluble orange dye is Reactive Orange 5, Acid Orange 10 or Acid Orange 12.

10. The method of claim 1 wherein said water-soluble green dye is Reactive Green 12, Acid Green 25, Acid Green 5 or Acid Green 3.

11. The method of claim 1 wherein said water-soluble violet dye is Acid Violet 17.

12. The method of claim 1 wherein each ink contains a humectant.

13. The method of claim 1 wherein each ink contains a surfactant.

14. The method of claim 1 wherein each said carrier is water.

15. The method of claim 1 wherein each ink contains 0.2 to 10.0 weight percent of dye.

16. The method of claim 1 wherein each ink contains from about 5 to about 60 weight percent of humectant.

* * * * *